United States Patent [19]

Izdebski

[11] Patent Number: 5,380,382
[45] Date of Patent: Jan. 10, 1995

[54] METHOD OF INSTALLING A METALLIC THREADED INSERT IN A COMPOSITE/RUBBER PANEL

[75] Inventor: Stanley J. Izdebski, Warwick, R.I.

[73] Assignee: The United states of America as represented by the Secretary of the Navy, Washington, D.C.

[21] Appl. No.: 199,927

[22] Filed: Feb. 22, 1994

[51] Int. Cl.⁶ ............................................. B32B 7/04
[52] U.S. Cl. ..................................... 156/91; 156/92; 411/82; 411/178
[58] Field of Search ...................... 156/293, 303.1, 91, 156/92, 294, 62.8, 94; 411/82, 178, 968; 29/460; 428/99; 244/131

[56] References Cited

U.S. PATENT DOCUMENTS

| | | | |
|---|---|---|---|
| 3,081,808 | 3/1963 | Rosan et al. | 411/178 |
| 3,921,280 | 11/1975 | King, Jr. | 411/178 |
| 4,729,705 | 3/1988 | Higgins | 411/82 |
| 4,981,735 | 1/1991 | Rickson | 156/92 |

Primary Examiner—Michael W. Ball
Assistant Examiner—Sam Chuan Yao
Attorney, Agent, or Firm—Michael J. McGowan; Prithvi C. Lall; Michael F. Oglo

[57] ABSTRACT

A method of installing a metallic threaded insert in a composite/rubber panel consists of threading a first insert section into a pre-formed hole in a fiberglass composite panel, and bonding a rubber panel over the fiberglass composite panel. The rubber panel includes an opening which is positioned over the first insert section. A second insert section is threaded onto an elongated positioning panel bolt and then the positioning bolt is threaded into the first insert section. The second insert section is threaded downwardly on the positioning so as to be in adjacent relation to the first insert section, and the opening in the rubber panel is filled with a rubber compound. The rubber compound is cured, preferably at room temperature, to set the second insert section in position and the positioning bolt is threaded out of the first and second insert sections.

2 Claims, 2 Drawing Sheets

METHOD OF INSTALLING A METALLIC THREADED INSERT IN A COMPOSITE/RUBBER PANEL

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The instant invention relates to installing insert fasteners in wall panels and more particularly to a method of installing a threaded insert fastener into a panel having a non-ferrous composite panel layer and a rubber panel layer.

2. Description of the Prior Art

Insert fasteners in mounting in a rigid wall panel have heretofore been known in the art. In this regard, the U.S. Pat. Nods. to Gauron No. 4,812,153; Winston U.S. Pat. No. 4,990,041; and Witten U.S. Pat. No. 5,082,405 represent the closest prior art to the subject invention of which the applicant is aware. Gauron discloses a plastic insert fastener having radially extending flanges. The Gauron fastener is set in a panel cavity and a flowable resin is introduced therearound. The resin flows around the radial flanges, and once cured, the resin holds the fastener in place within the panel. It is pointed out that the Gauron bonding process deals only with a resin/plastic cohesive bond between a plastic fastener and a composite metal panel and thus it is not suitable for bonding a metallic insert fastener to a rubber panel nor for installing a metallic fastener into a nonferrous composite panel without the use of a bonding compound. The Winston patent discloses a fastening device which enables a plurality of metal plates or laminae to be flexibly bonded together. The fastening device includes a plurality of elongate members which define channels for the introduction of a thermosetting resin between the plates. The thermo-setting resin also fills the center of the channel. The Winston fasteners act as structural reinforcements between the layered plates so as to prevent shearing of adjacent to late. Since the center of Winston insert is filled with resin, it does not provide a threaded opening for threadedly receiving a mounting screw, or spring plunger, or the like. The Witten patent discloses an insert fastener that is potted with epoxy into a cavity which is formed in a cellular, or honeycomb- type, wall. The insert fastener described and illustrated in Witten includes radial flanges which require that the cavity have diameter that is equal to or larger than the diameter of the flanges. After setting the fastener in position in the cavity, the cavity is filled with epoxy. The flanges provide aided surface area for bonding of the epoxy.

SUMMARY OF THE INVENTION

The instant invention provides a novel method of installing a metallic threaded insert into a composite/rubber panel having a non-ferrous composite panel layer, such as a fiberglass composite panel, and a rubber panel layer. The instant threaded insert comprises first and second metallic threaded insert sections, such as helicoid inserts, which have inwardly and outwardly facing threads. Briefly, the instant method comprises the steps of: threading a first insert section into a pre- formed hole in a composite panel and bonding a rubber panel to the composite panel. The rubber panel includes an opening which is positioned over the first insert section. The method further comprises threading a second insert section onto a positioning bolt and then threading the positioning bolt into the first insert section. The second insert section is thereafter threaded downwardly so as to be positioned in adjacent relation to the first insert section, and the opening in the rubber panel is filled with a rubber compound. The rubber compound is then cured to set the second insert section in position and the positioning bolt is removed from the first and second inserts, thereby forming a continuous inward thread which extends through both the rubber panel and the composite panel. The threaded insert is thereafter operative for receiving a spring plunger therein.

Accordingly, it is an object of the instant invention to provide a method of installing an insert fastener into a composite/rubber panel It is another object to provide a method of installing a metallic threaded insert fastener in a non-ferrous composite panel without using an adhesive.

It is yet another object to provide a method of installing a metallic threaded insert fastener in a rubber panel.

It is still another object to provide a metallic threaded insert fastener which extends through a composite panel layer and a rubber panel layer.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
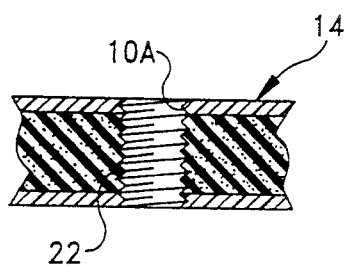
FIG. 1 is a cross-sectional view of a fiberglass composite panel with the first insert section threaded into a pre-formed hole.

Referring now to the drawings, the method of installing a metallic threaded insert- in a composite/rubber panel is illustrated in FIGS. 1–10. The metallic threaded insert is generally indicated at 12 and it comprises two self-tapping helicoid inserts 10A and 10B which have inwardly facing and outwardly facing threads. The composite/rubber panel is generally indicated at 12 and it comprises a non-ferrous composite panel, such as a fiberglass composite panel generally indicated at 14, and a rubber, or rubber-like, panel 16. The fiberglass composite panel 14 comprises a syntactic foam core 18 which is sandwiched between two outer skins 20 comprising fiberglass sheets filled with epoxy. It is pointed out that helicoid inserts 10A and 10B are only manufactured in particular heights, and therefore it is necessary to use two independent helicoid inserts 10A and 10B in order to form a continuous inward thread through the fiberglass composite panel 14 and the rubber panel 16.

Figure 2:
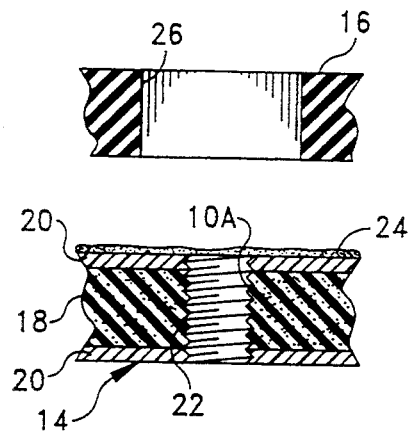
FIG. 2 is an exploded cross-sectional view of the fiberglass composite panel prepared with a bonding compound, and the rubber panel positioned thereover.
Figure 3:
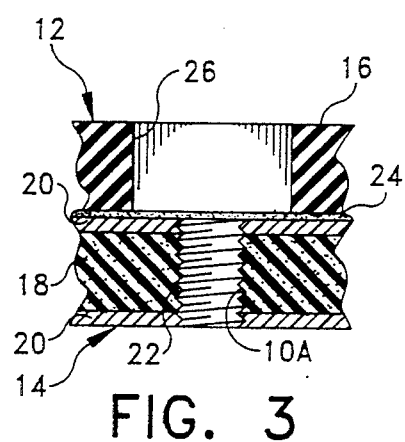
FIG. 3 is a cross-sectional view of the fiberglass composite panel and rubber panel bonded together.
Figure 4:
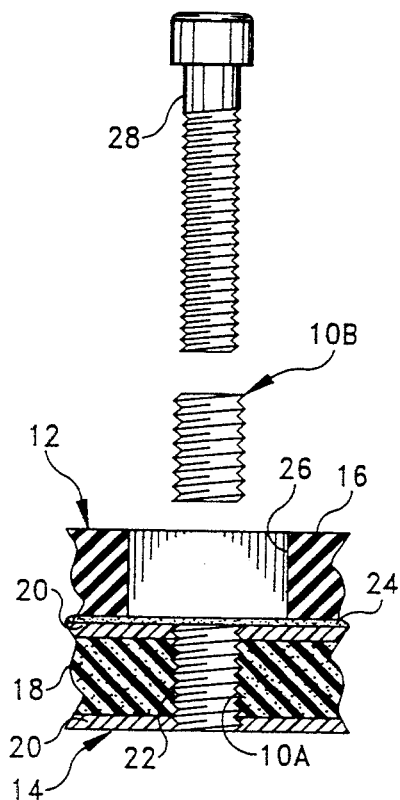
FIGS. 4 and 5 are sequential views of the second threaded insert section and the positioning bolt axially aligned for installation and the second threaded insert section threaded onto the positioning bolt.
Figure 5:
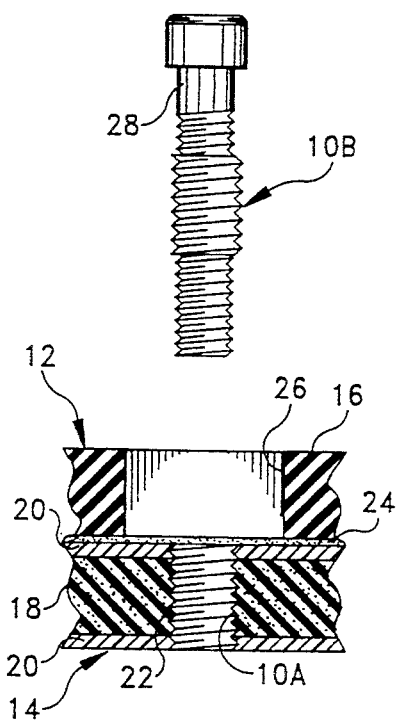
Figure 6:
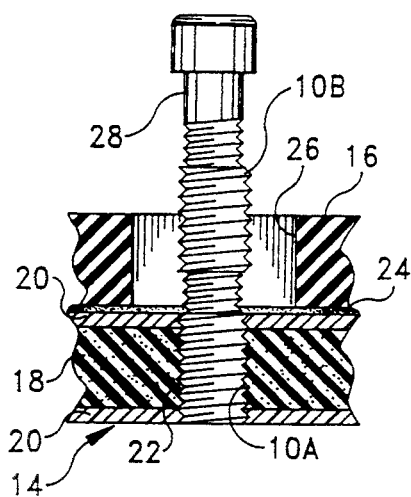
FIG. 6 and 7 are further sequential views of the positioning bolt threaded into the first threaded insert section and the second threaded insert section rotated downwardly so as to be positioned adjacent to the first threaded insert section.
Figure 7:
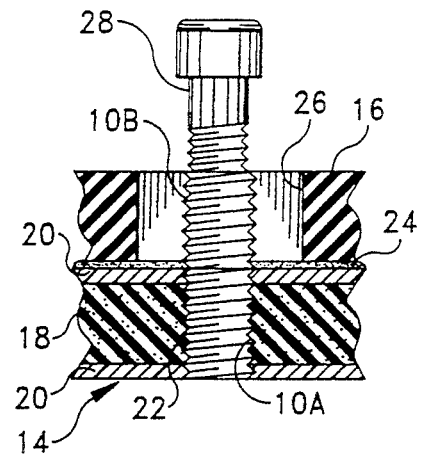
Figure 8:
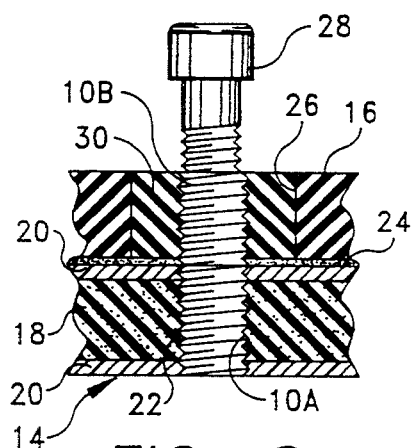
FIG. 8 is a cross-sectional view thereof with the rubber panel opening filled with a rubber compound.
Figure 9:
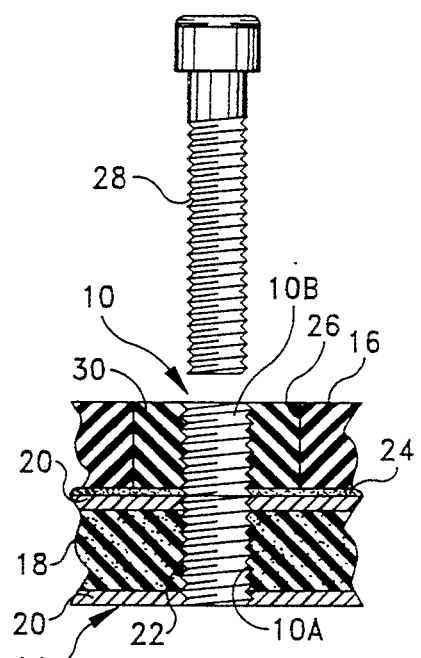
FIG. 9 is a similar cross-sectional view thereof with the positioning bolt removed from the threaded insert sections.
Figure 10:
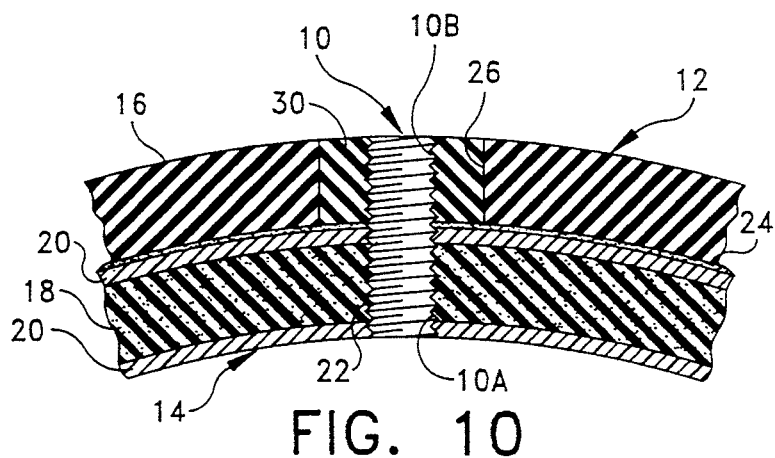
FIG. 10 is a cross-sectional view of a curved composite/rubber panel according to the present invention.

The method of installing the helicoid inserts 10A and 10B into the panel 12 comprises the steps of: forming a hole 22 in the fiberglass composite panel 14, and threading the first helicoid insert 10A into the pre-formed hole (FIG. 1). It is pointed out that the hole 22 has a slightly smaller diameter than the outer diameter of the helicoid insert 10A so that the outwardly facing threads become imbedded into the panel 14 to hold the helicoid insert 10A in position. The rubber panel 16 is then bonded to the fiberglass composite panel 14 with a conventional bonding compound 24 (FIGS. 2 and 3). The rubber panel 16 includes an opening 26 which is larger than the helicoid insert 10B, and the opening 26 is positioned so that it overlies the first helicoid insert 10A. The method further comprises the steps of threading the second helicoid insert 10B onto a positioning bolt 28 and then threading the positioning bolt 28 into the first helicoid insert 10A (FIGS. 4, 5 and 6). The second helicoid insert 10B is thereafter threaded downwardly so as to be positioned in adjacent relation to the first helicoid insert 10A (FIG. 7), and the opening 26 in the rubber panel 16 is filled with a flowable rubber compound 30. The rubber compound 30 is cured to set the second helicoid insert 10B in position and then the positioning bolt 28 is threaded out of the helicoid inserts 10A and 10B thereby forming an integral threaded insert 10 having a continuous inward thread which extends through both the rubber panel 16 and the fiberglass composite panel 14. The threaded insert 10 is thereafter operative for receiving threaded devices as desired.

It can therefore be; seen that the instant invention provides a unique method of installing a metallic threaded insert into a composite/rubber panel 2. The metallic insert comprises two helicoid inserts 10A ant 10B which are individually installed into the separate layered of the panel. The first helicoid insert is tightly threaded into a preformed hole in the fiberglass composite panel and thus requires no adhesive to maintain it in position. The second helicoid insert 10B is threaded onto a positioning bolt 28, the positioning bolt 28 is threaded into the first helicoid insert i()A and the second helicoid insert 10B is threaded downwardly to meet the first helicoid insert 10A. The opening 26 in the rubber panel 16 is filled with a rubber compound 30, the compound 30 is cured at room temperature to set the second helicoid insert 10B in position, and the positioning bolt 28 is removed. The use of the positioning bolt 28 is extremely important in that it holds the second helicoid insert 10B in position, it aligns the inward threads of both the first and second helicoid inserts 19A and 10B, and it retains the excess flow of the rubber compound 30 until it cures. The instant method of securing the helicoid insert in the rubber panel thus provides a significant advantage over the prior art in that no heating and special expansion tools are required. For these reasons, the method of the instant invention is believed to represent a significant advancement in the threaded insert art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method of installing a metallic threaded insert in a composite/rubber panel, said composite/rubber panel comprising a non-ferrous composite panel layer and a rubber panel layer, said insert comprising first and second insert sections, said insert sections having inwardly and outwardly facing threads, said method comprising the steps of:

threading said first insert section into a pre-formed hole in said non-ferrous composite panel layer, said hole having a diameter slightly smaller than an outer diameter of said first insert section, said outwardly facing threads on said first insert section becoming imbedded in said non-ferrous composite panel layer so as to frictionally retain said insert in said hole;

bonding said rubber panel layer to said non-ferrous composite panel layer so that an opening in said rubber panel layer overlies said first insert section, said opening having a layer dimension than said second threaded insert section;

threading said second insert section onto an elongated positioning bolt; threading said positioning bolt into said first insert section;

threading said second insert section downwardly on said positioning bolt so as to be positioned in adjacent relation to said first insert section;

filling said opening with a flowable rubber compound;

curing said rubber compound so that it flows into the outwardly facing threads of said second insert section; and threading said positioning bolt out of said first and second insert sections thereby forming an integral threaded insert having a continuous inward thread which extends through said rubber panel layer and said composite panel layer.

2. The method of claim 1 further comprising the step of preparing a surface of said non-ferrous composite panel layer with a bonding compound for said step of bonding said rubber panel layer thereto.

* * * * *